US008833640B2

(12) United States Patent
Martch et al.

(10) Patent No.: US 8,833,640 B2
(45) Date of Patent: Sep. 16, 2014

(54) UTILIZING MATRIX CODES DURING INSTALLATION OF COMPONENTS OF A DISTRIBUTION SYSTEM

(75) Inventors: Henry Gregg Martch, Parker, CO (US); Germar Schaefer, Monument, CO (US); Max S. Gratton, Lakewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 334 days.

(21) Appl. No.: 13/037,316

(22) Filed: Feb. 28, 2011

(65) Prior Publication Data
US 2012/0217293 A1  Aug. 30, 2012

(51) Int. Cl.
*G06F 17/00* (2006.01)
*H04B 17/00* (2006.01)

(52) U.S. Cl.
CPC ........ *H04B 17/0057* (2013.01); *H04B 17/0065* (2013.01)
USPC ...................... 235/375; 235/462.46; 341/176

(58) Field of Classification Search
USPC .............................. 235/375, 462.46; 341/176
See application file for complete search history.

(56) References Cited

U.S. PATENT DOCUMENTS

| | | | |
|---|---|---|---|
| 4,809,325 A | 2/1989 | Hayashi et al. | |
| 4,837,414 A | 6/1989 | Edamula | |
| 5,500,681 A | 3/1996 | Jones | |
| 5,510,603 A | 4/1996 | Hess et al. | |
| 5,581,636 A | 12/1996 | Skinger | |
| 5,602,377 A | 2/1997 | Beller et al. | |
| 5,703,349 A | 12/1997 | Meyerson et al. | |
| 5,959,285 A | 9/1999 | Schuessler | |
| 5,978,855 A | 11/1999 | Metz et al. | |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

Byford, D., "Universal Interactive Device," International Business Machines Corporation, Jun. 1998, 1 page.

(Continued)

*Primary Examiner* — Allyson Trail
(74) *Attorney, Agent, or Firm* — Kilpatrick Townsend & Stockton LLP (57) ABSTRACT

One embodiment described herein may take the form of a system or method for generating one or more matrix codes that may then be obtained by a reader device, the one or more matrix codes including information that may be utilized to aid in the installation and configuration of one or more components of a distribution system. In one embodiment, the one or more matrix codes may be utilized by the system to configure one or more aspects and features of a component of the system, such as a receiver or display device. In another embodiment, the one or matrix codes may provide system information to a provider or an installer to verify proper installation of one or more components. The information encoded in the matrix codes may include any type of information about one or more components of the distribution system to aid the system or an installer in configuring or installing components of the system.

20 Claims, 5 Drawing Sheets

(56) References Cited

U.S. PATENT DOCUMENTS

| | | |
|---|---|---|
| 6,006,990 A | 12/1999 | Ye et al. |
| 6,058,238 A | 5/2000 | Ng |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 2001/0037297 A1 | 11/2001 | McNair |
| 2001/0052133 A1 | 12/2001 | Pack et al. |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2005/0011958 A1 | 1/2005 | Fukasawa et al. |
| 2005/0015800 A1 | 1/2005 | Holcomb |
| 2005/0055281 A1 | 3/2005 | Williams |
| 2005/0059339 A1 | 3/2005 | Honda et al. |
| 2005/0125301 A1 | 6/2005 | Muni |
| 2005/0149967 A1 | 7/2005 | Hanley et al. |
| 2005/0180804 A1 | 8/2005 | Andrew et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0095286 A1 | 5/2006 | Kimura |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernathy et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2009/0029725 A1 | 1/2009 | Kindberg |
| 2009/0031071 A1 | 1/2009 | Chiu |
| 2009/0031373 A1* | 1/2009 | Hogyoku ............... 725/104 |
| 2009/0083808 A1 | 3/2009 | Morrison |
| 2009/0088213 A1* | 4/2009 | Rofougaran ........... 455/562.1 |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li et al. |
| 2009/0212113 A1 | 8/2009 | Chiu et al. |
| 2009/0234570 A1 | 9/2009 | Sever |
| 2009/0254954 A1 | 10/2009 | Jeong |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0030068 A1 | 2/2011 | Imai |
| 2011/0039573 A1 | 2/2011 | Hardie |
| 2011/0065451 A1 | 3/2011 | Danado et al. |
| 2011/0087539 A1 | 4/2011 | Rubinstein et al. |
| 2011/0107386 A1 | 5/2011 | De Los Reyes et al. |
| 2011/0138408 A1 | 6/2011 | Adimatyam et al. |

(56) References Cited

U.S. PATENT DOCUMENTS

| | | |
|---|---|---|
| 2011/0208710 A1 | 8/2011 | Lesavich |
| 2011/0258058 A1* | 10/2011 | Carroll et al. .......... 705/15 |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0096499 A1 | 4/2012 | Dasher et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1* | 7/2012 | Beals et al. .......... 341/176 |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2013/0068838 A1 | 3/2013 | Gomez et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2010/149161 A1 | 12/2010 |
| WO | 2011/009055 A2 | 1/2011 |

OTHER PUBLICATIONS

International Search Report and Written Opinion of PCT/US11/60094 mailed on Mar. 30, 2012, 7 pages.

International Search Report of PCT/US11/60109 mailed on Feb. 14, 2012, 3 pages.

International Search Report and Written Opinion of PCT/US2011/068161 mailed on Jun. 14, 2012, 19 pages.

International Search Report and Written Opinion of PCT/US2012/021657 mailed on May 23, 2012, 12 pages.

International Search Report and Written Opinion of PCT/US2012/022405 mailed on Apr. 19, 2012, 11 pages.

International Search Report and Written Opinion of PCT/US2012/024923 mailed on May 22, 2012, 12 pages.

International Search Report and Written Opinion of PCT/US2012/024956 mailed on Jun. 11, 2012, 10 pages.

International Search Report and Written Opinion of PCT/US2012/025502 mailed Jun. 8, 2012, 13 pages.

International Search Report and Written Opinion of PCT/US2012/025607 mailed Jun. 8, 2012, 13 pages.

International Search Report and Written Opinion of PCT/US2012/025634 mailed on May 7, 2012, 8 pages.

International Search Report and Written Opinion of PCT/US2012/026373 mailed Jun. 13, 2012, 14 pages.

International Search Report and Written Opinion of PCT/US2012/026722 mailed Jun. 28, 2012, 11 pages.

Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.

Yang, C., et al., "Embedded Digital Information Integrated by Video-on-Demand System," Proceedings of the Fourth International Conference on Networked Computing and Advanced Information Management, IEEE Computer Society, 2008, 6 pages.

U.S. Appl. No. 12/971,349, filed Dec. 17, 2010, Office Action mailed Jul. 16, 2012, 11 pages.

U.S. Appl. No. 12/984,385, filed Jan. 4, 2011, Office Action mailed Jul. 12, 2012, 16 pages.

U.S. Appl. No. 12/986,721, filed Jan. 7, 2011, Notice of Allowance mailed Jun. 21, 2012, 7 pages.

U.S. Appl. No. 13/020,678, filed Feb. 3, 2011, Office Action mailed Jul. 30, 2012, 15 pages.

U.S. Appl. No. 13/035,525, filed Feb. 25, 2011, Office Action mailed Jul. 18, 2012, 15 pages.

Extended European Search Report for EP 12152690.9 dated Jun. 19, 2012, 9 pages.

International Search Report and Written Opinion of PCT/US2012/026624 mailed Aug. 29, 2012, 14 pages.

U.S. Appl. No. 12/958,073, filed Dec. 1, 2010, Office Action mailed Aug. 31, 2012, 12 pages.

U.S. Appl. No. 12/961,369, filed Dec. 6, 2010, Final Rejection mailed Oct. 30, 2012, 17 pages.

U.S. Appl. No. 12/971,349, filed Dec. 7, 2010 ), Final Rejection mailed Oct. 24, 2012, 11 pages.

U.S. Appl. No. 12/953,227, filed Nov. 23, 2010, Office Action mailed Nov. 7, 2012, 31 pages.

U.S. Appl. No. 13/015,382, filed Jan. 27, 2011, Office Action Mailed Nov. 13, 2012, 7 pages.

U.S. Appl. No. 13/016,483, filed Jan. 28, 2011 Office Action mailed Nov. 2, 2012, 18 pages.

U.S. Appl. No. 12/953,273, filed Nov. 23, 2010, Notice of Allowance, mailed Oct. 18, 2012, 11 pages.

U.S. Appl. No. 13/034,482, filed Feb. 24, 2011, Office Action mailed Oct. 19, 2012, 11 pages.

U.S. Appl. No. 13/035,474, filed Feb. 25, 2011, Office Action mailed Oct. 30, 2012, 11 pages.

U.S. Appl. No. 12/960,285, filed Dec. 3, 2010, Final Office Action mailed Dec. 6, 2012, 17 pages.

(56) References Cited

OTHER PUBLICATIONS

U.S. Appl. No. 13/037,312, filed Feb. 28, 2011, Office Action mailed Aug. 15, 2012, 9 pages.
"Android App Reviews & Showcase Just a Tapp Away," Android Tapp, 10 pp. Found online at http://www.androidtapp.com/download-the-weather-channel-android-app-from-your-tv/, Oct. 22, 2010.
"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.
"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.
"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.com/qr_barcode_technology.html, Oct. 22, 2010.
Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.
Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
Smith, Lindsay, "Barcodes Make History on Global TV", 3 pp. Found online at http://www.lindsaysmith.com/worlds-first-mobio-mini-telethon/, Oct. 22, 2010.
Nghee, Seah Y., "Data Transmission Between PDA and PC Using WiFi for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.
Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.
Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.
Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
U.S. Appl. No. 12/964,478, filed Dec. 9, 2010, Non-Final Office Action mailed Mar. 26, 2013, 19 pages.
U.S. Appl. No. 12/961,369, filed Dec. 6, 2010, Non-Final Office Action mailed Mar. 25, 2013, 17 pages.
U.S. Appl. No. 12/953,227, filed Nov. 23, 2010, Final Office Action mailed May 24, 2013, 17 pages.
U.S. Appl. No. 13/014,591, Notice of Allowance mailed May 24, 2013, 32 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2001, Final Office Action mailed Apr. 18, 2013, 14 pages.
U.S. Appl. No. 13/035,525, filed Feb. 25, 2011, Non-Final Office Action mailed May 15, 2013, 15 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/981,244, filed Dec. 29, 2010, Office Action mailed Dec. 21, 2012, 23 pages.
U.S. Appl. No. 12/984,385, filed Jan. 4, 2011, Notice of Allowance mailed Nov. 28, 2012, 11 pages.
U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office action mailed Dec. 19, 2012, 29 pages.
U.S. Patent Application No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.

(56) References Cited

OTHER PUBLICATIONS

U.S. Appl. No. 13/037,312, filed Feb. 28, 2011, Final Office Action mailed Feb. 28, 2013, 18 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.
Liu, Yue et al., "Recognition of QR code with mobile phones," Control and Decision Conference, 2008. CCDC 2008. Jul. 2-4, 2008, pp. 203, 206.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Jul. 12, 2013, 22 pages.
U.S. Appl. No. 12/981,244, filed Dec. 29, 2010, Final Office Action mailed Oct. 30, 2013, 10 pages.
U.S. Appl. No. 13/016,483, filed Jan. 28, 2011 Final Office Action mailed Jun. 27, 2013, 13 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Non-Final Rejection mailed May 15, 2013, 30 pages.
U.S. Appl. No. 12/973,431, filed Dec. 20, 2010, Final Office Action mailed Aug. 27, 2013, 11 pages.
U.S. Appl. No. 13/006,270, filed Jan. 13, 2011, Non-Final Office Action mailed Oct. 8, 2013, 20 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011 Final Office Action mailed Oct. 16, 2013, 28 pages.
U.S. Appl. No. 13/192,287, filed Jul. 27, 2011 Non Final Office Action mailed Jun. 13, 2013, 22 pages.
U.S. Appl. No. 13/673,480, filed Nov. 9, 2012 Final Office Action mailed Sep. 9, 2013, 10 pages.

* cited by examiner

UTILIZING MATRIX CODES DURING INSTALLATION OF COMPONENTS OF A DISTRIBUTION SYSTEM

TECHNICAL FIELD

Embodiments disclosed herein relate generally to providing and displaying multimedia content, and more particularly to utilizing one or more matrix codes to aid in the installation or configuration of one or more components of a distribution system.

BACKGROUND

Barcodes and other optical machine-readable data representations are often used in commerce to provide a quick method of obtaining information about a product or service. In general, a barcode consists of varying widths of lines that may be read by a scanner, where the widths and spaces between the lines of the barcode provide information, such as an identification number of a product. Because the information of a barcode is conveyed through the varying widths of the lines of the code, barcodes are often referred to as linear or one-dimensional (1D) codes. In more recent years, a matrix (or two-dimensional) code has been developed to provide additional information in the code by encoding information in both the width and height dimensions of the matrix. Matrix codes, one example of which is as a quick response (QR) code, generally consist of black modules arranged in a square pattern on a white background, the configuration of which provides information to a scanner or reader. In this manner, matrix codes may be utilized to convey information to any electronic device once obtained by the scanner or reader device.

BRIEF SUMMARY

One implementation may take the form of a method for configuring a device of a system. The method may comprise the operations of generating, utilizing an electronic device, one or more matrix codes including one or more measurements determined by the electronic device, transmitting, utilizing the electronic device, the one or more matrix codes to at least one display device and receiving the one or more measurements determined by the electronic device from a reader device. In addition, the method may also include the operation of providing instructions to configure the device of the system based on the one or more measurements determined by the electronic device.

Another implementation may take the form of a system comprising an electronic device and a reader device. The electronic device may comprise one or more processing units that generate one or more matrix codes including an identifier of one or more components of a distribution system and at least one output component in communication with a display device, wherein the one or more processing units transmit the one or more matrix codes to the display device utilizing the output component. The reader device may comprise at least one optical input component configured to obtain an image of the one or more matrix codes and at least one processing unit configured to decode the obtained one or more matrix codes to retrieve the identifier of one or more components of a distribution system. In addition, the identifier of one or more components of a distribution system may be utilized to encrypt one or more messages provided by the distribution system to the one or more components.

Yet another implementation may take the form of a method for establishing communication between two electronic devices. The method may comprise the operations of generating, utilizing a receiver, a matrix code that includes an identifier of a repeater device associated with the receiver, transmitting, utilizing the electronic device, the matrix code to a display device and obtaining, utilizing a reader device, the matrix code from the display device. In addition, the method may include the operations of retrieving the identifier of the repeater device associated with the receiver and utilizing the identifier of the repeater device to establish a connection between the reader device and the repeater device.

DETAILED DESCRIPTION

One embodiment described herein may take the form of a system or method for generating one or more matrix codes that may then be obtained by a reader device, the one or more matrix codes including information that may be utilized to aid in the installation and/or configuration of one or more components of a distribution system. In one embodiment, the one or more matrix codes may be utilized by the system to configure one or more aspects and features of a component of the system, such as a receiver or display device. In another embodiment, the one or more matrix codes may provide system information to a provider or an installer to verify proper installation of one or more components of the system. In general, the one or more matrix codes may be obtained and decoded by one or more devices of the system such that the information encoded with the codes may be determined. This information may include any type of information about one or more components of the distribution system to aid the system or an installer in configuring and/or installing components of the system. In another embodiment, one or more items accompanying the components of the distribution system may include the one or more matrix codes that contain information about the components of the system. Again, such information may be utilized by the distribution system and/or installer to configure and/or install the components.

Figure 1:
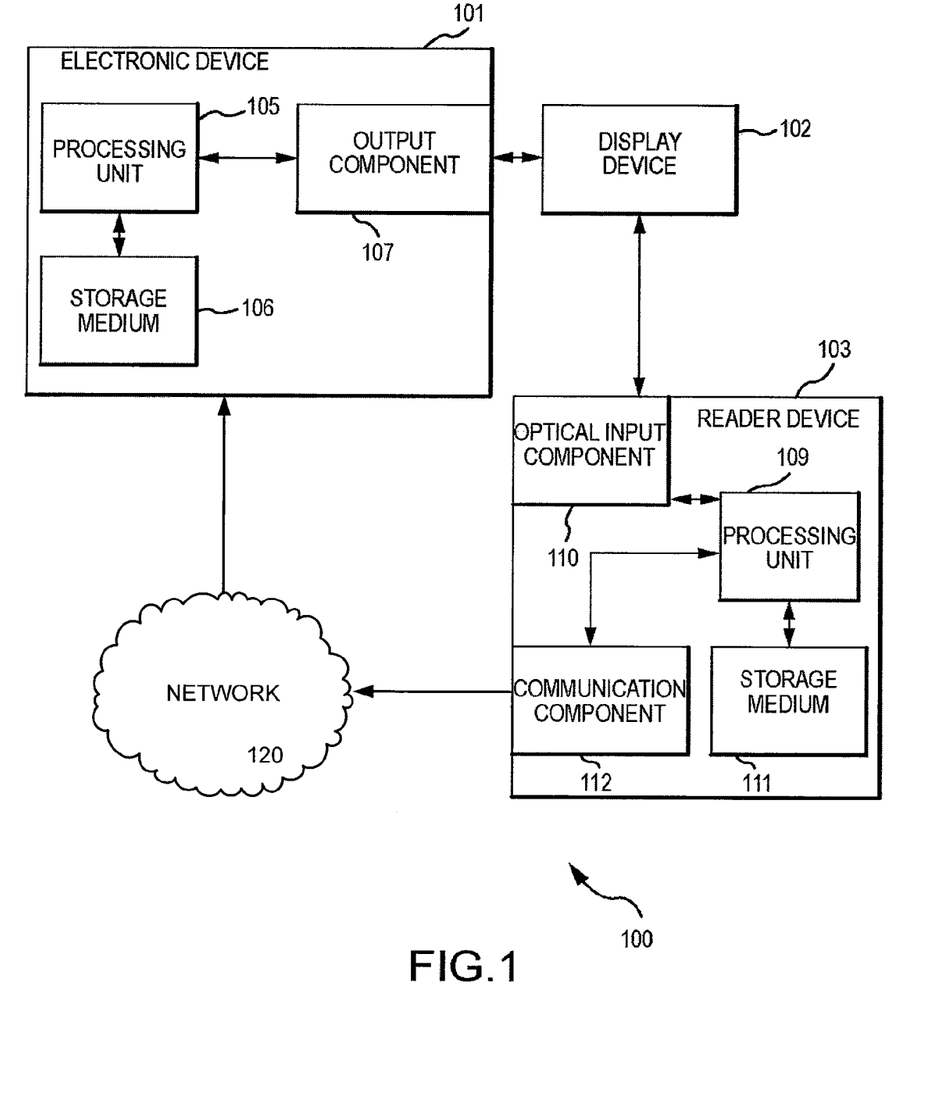
FIG. 1 is a block diagram illustrating a system for providing a multimedia presentation and for utilizing one or more matrix codes to aid in installing one or more components of the system.

FIG. 1 is a block diagram illustrating a system 100 for providing a multimedia presentation on a display device 102 and for utilizing one or more matrix codes to aid in the installation and/or configuration of one or more components of a distribution system, such as the electronic device 101 of FIG. 1. In general, the system 100 may include a electronic device 101 (which may be any kind of electronic device such as a television, a television receiver, a digital video recorder, a digital video disc player, an automobile, a computing device, a telephone, a kitchen appliance, a video game system, a security system, and so on), at least one display device 102 (which may be any kind of display device such as a cathode ray tube display, a liquid crystal display, a television, a computer monitor, a projector display, and so on), and a reader device 103 (which may be any type of device capable of detecting and decoding a matrix code such as a mobile telephone equipped with a camera, a mobile computing device that includes a camera, a remote control and so on). One or more networks may also be included in the system (illustrated as a single network 120 in FIG. 1) for receiving information from the reader device 103 and/or providing information or multimedia presentations to the electronic device 101 for display on the display device.

The electronic device 101 may include one or more processing units 105, one or more non-transitory storage media 106 (which may take the form of, but is not limited to, a magnetic storage medium; optical storage medium; magneto-optical storage medium; read only memory; random access memory; erasable programmable memory; flash memory; and so on), and one or more output components 107. The output components 107 may be configured to communicate with a display device 102, including providing one or more matrix codes for display on the display device in addition to providing a multimedia presentation to the display. Additionally, although the display device 102 is illustrated as separate from the electronic device, it is understood that in various implementations of the system, the display device may be incorporated into the electronic device. The processing unit 105 of the electronic device 101 may execute instructions stored in the non-transitory storage medium 106 to dynamically generate one or more matrix codes (such as one or more QR codes), provide one or more multimedia presentations to the display and transmit the dynamically generated matrix codes and multimedia presentations to the display device 102 utilizing the output component 107.

In one embodiment, the electronic device 101 may be a receiver of a multimedia presentation distribution system. In such an embodiment, the receiver 101 of the system may receive an encrypted signal of a multimedia presentation and convert it into a signal that a display or other compatible device may recognize and manipulate in order to present the multimedia presentation to one or more users. In addition, the receiver 101 may provide the converted signal to a display device 102, such as a television or computer screen, for display to the user. In one implementation, the receiver 101 may receive the encrypted signal from a satellite or through a digital cable or network connection, collectively shown in FIG. 1 as network 120.

A reader device 103 may also be included in the system and may detect the one or more matrix codes displayed by the display device 102. The reader device may also decode the information contained within the obtained matrix codes, such as information concerning the electronic device and/or a multimedia presentation provided by the electronic device 101. The reader device may include one or more processing units 109 which execute instructions stored in one or more non-transitory storage media 111 in order to receive the one or more matrix codes and either provide the received matrix codes to the network 120 or decode the information within the matrix codes. The reader device may also include an optical input device 110 (such as a camera, a barcode scanner, and so on) for detecting the matrix code displayed by the display device as well as a communication component 112 for communicating with one or more networks to provide the obtained matrix codes or decoded information to one or more networks 120.

One or more networks 120 may also be included in the system 100. The networks 120 may communicate with electronic device 101 and/or the reader device 103. In one implementation when communicating the with reader device 103, the network 120 may receive the obtained matrix code. In another implementation, the network may receive the information contained within the obtained matrix codes after such information is decoded from the matrix code by the reader device 103. In addition, the network may provide information, such as the information received from the reader device 103 and obtained from the matrix code, to the electronic device 101 or to a third party recipient. For example, the information may be transmitted to a computing device of a managing entity of the distribution system. In another example, the information may be transmitted to an electronic device associated with an installer of the electronic device. Further, in the implementation where the electronic device 101 is a receiver of a multimedia distribution system, the network 120 may also provide one or more multimedia presentations for display on the display device 102. As should be appreciated, the transmission of information to or from the network may occur in any manner known or hereafter developed, including but not limited to, transmission through a network connection or a wireless transmission.

In various implementations, the electronic device 101 may transmit the one or more matrix codes by themselves to the display device 102 via the output component 107 for the display device to display only the one or more matrix codes at a particular time. However, in various other implementations (such as implementations where the electronic device is a television receiver, digital video recorder, or other such device that provides images to a display), the electronic device may transmit one or more images (such as a video stream of a multimedia presentation) to the display device via the output component. In such implementations, the electronic device may combine the one or more matrix codes with the one or more images and transmit the combination to the display device via the output component.

Figure 2:
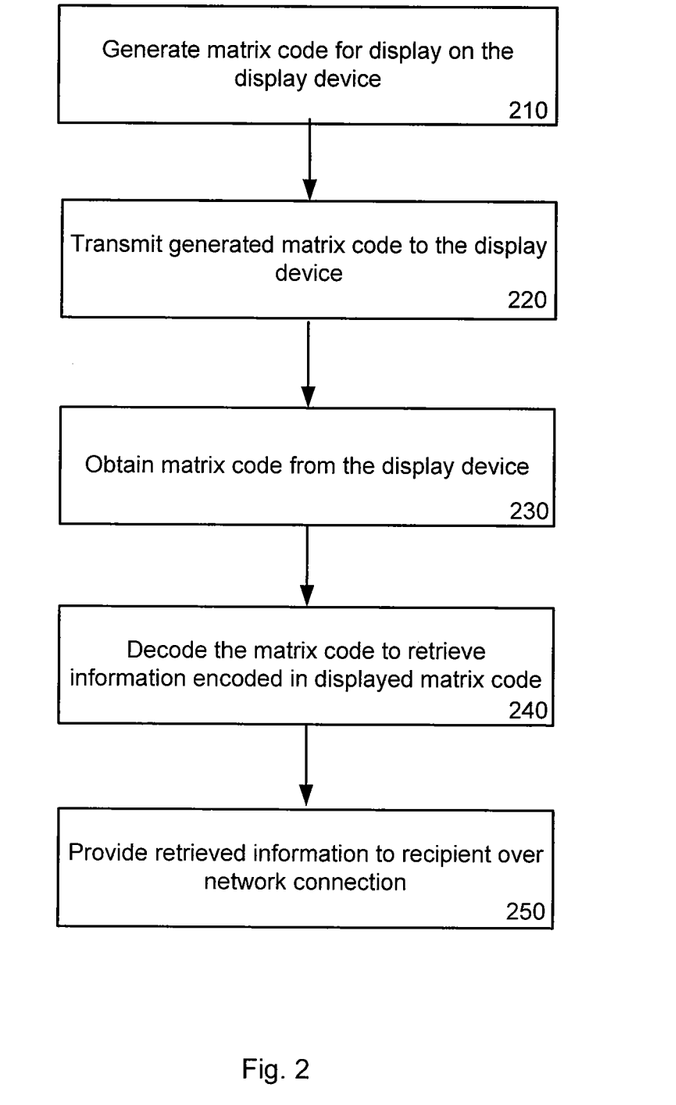
FIG. 2 is a flowchart depicting a method for a system to generate one or more matrix codes to provide information to a recipient for use in installing one or more components of a multimedia distribution system.

As mentioned above, the one or more matrix codes generated by the electronic device may be used to configure and/or install one or more components into a distribution system. FIG. 2 is a flowchart depicting a method for the system (such as that illustrated in FIG. 1) to generate one or more matrix codes to provide information to a recipient for use in installing and/or configuring one or more components of a multimedia distribution system. In one example, the method of FIG. 2 may be utilized by a multimedia distribution system to configure the electronic device to receive one or more multimedia presentations for display on the display device.

Beginning in operation 210, the electronic device may generate a matrix code for display on the display device. In general, the generated matrix code may include any information pertinent to the configuration or installation of one or more components of the system. For example, the generated matrix codes may include identification information of the one or more components, such as an identification (ID) number of a receiver or an ID number of a smart card (and/or other kind of security processor) associated with the receiver. In another example, the matrix codes may include one or more measurements received by the electronic device or other component of the system. In one particular example, the electronic device may detect a signal strength of a received signal, such as a signal strength received at the receiver from a satellite of a satellite distribution system, and encode such information into the one or more matrix codes. In general, any status information, identification information, measurements performed by a component, received information, and any other information that may be utilized by a system to install or configure one or more components may be encoded into the one or more matrix codes generated by the electronic device.

Figure 3:
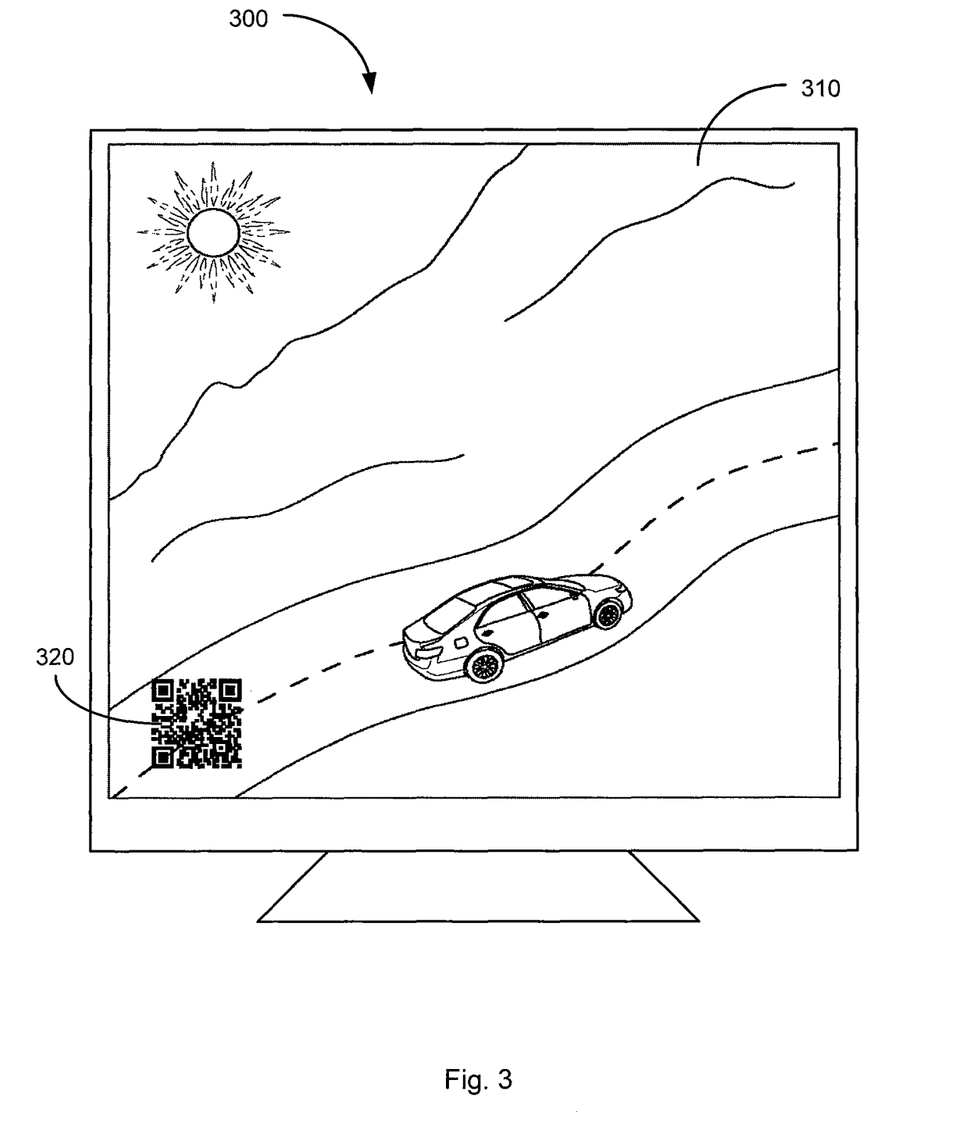
FIG. 3 is a diagram of a display device of a distribution system displaying a multimedia presentation and a matrix code containing information used during installation of one or more components of the system.

In operation 220, the electronic device may transmit the generated matrix code to a display device for display on the display device. As mentioned above, the matrix code may be displayed alone on the display device or may be incorporated into another image, such as into an image or frame of a video component of a multimedia presentation. For example, FIG. 3 is a diagram of a display device 300 displaying a multimedia presentation 310 and a matrix code 320 containing information used during installation of one or more components of the system. As shown, the matrix code 320 may be integrated into a multimedia presentation 310 for display. In addition, while the diagram of FIG. 3 shows a single matrix code displayed, it should be appreciated that a plurality of matrix codes may be displayed on the display device, either simultaneously or in sequence. Also, it should be appreciated that the one or more matrix codes 320 may be displayed on the display device with no accompanying multimedia presentation.

Once the matrix code is displayed on the display device, the matrix code may be obtained from the display by the reader device in operation 230. As described above, the reader device may obtain the matrix code from the display device by capturing a still image or video of the display screen. Further, the reader device may be configured to locate a matrix code embedded within a displayed image or frame of a video component of a multimedia presentation. To obtain the matrix code from an image, the reader device may utilize image recognition technology to isolate the matrix code and ignore the portions of the image not including the matrix code. For example, the reader device may utilize edge detection technology to analyze the captured image and detect the edges of the matrix code to isolate the code. In another example, the reader device may conduct a pattern recognition analysis on the captured image to detect the matrix code. In general to obtain the matrix code, the reader device may obtain a still image (utilizing an optical device) or video (utilizing a video camera) of the display screen containing the matrix code.

In operation 240, the matrix code may be decoded to retrieve the information contained within the matrix code. In one embodiment, the reader device may perform the analysis on the obtained matrix code to retrieve the encoded information. As mentioned above, the reader device may utilize one or more processing units to decode the matrix code and retrieve the information contained within the matrix code. Further, although described above with reference only to a reader device, one of several components of the distribution system may be utilized to retrieve the encoded information. For example, in one embodiment, the obtained matrix code may be transmitted over the network to a recipient for analysis and decoding. In another embodiment, the retrieved information may be transmitted over the network to the electronic device for analysis. In yet another embodiment, the obtained matrix code may be transmitted unanalyzed through the network to an electronic device outside of the system, such as to an electronic device associated with an installer of a distribution system. In this embodiment, the electronic device outside of the system may analyze and retrieve the encoded information from the matrix code.

In those embodiment described above where the information of the matrix code is retrieved prior to transmission to the recipient, the retrieved information may be provided over the network to the recipient in operation 250. As mentioned, the recipient may be a component of the system, may be a third party component (such as an administrator device for the distribution system), may be a computing device of a provider entity associated with the distribution system, may be a computing device associated with an installer of one or more components of the system and so on.

Utilizing the system of FIG. 1 and/or the method of FIG. 2, one or more matrix codes may be generated and obtained that may include information to aid in the installation and/or configuration of one or more components of a distribution system. For example, as mentioned above, the matrix code may be encoded with information pertaining to the signal strength measured by a receiver of a satellite or other transmitting component of a distribution system. During installation of the system, the satellite dish of the system may be oriented to point to a particular area in the sky to receive the signal from the satellite. In general, the closer the satellite dish is oriented toward transmitting satellite, the stronger the received signal strength may be. Thus, during installation of the satellite dish, the receiver may detect varying levels of signal strength as the satellite dish is adjusted by an installer to the proper position to receive the satellite-generated signal. Utilizing the embodiments described above, the receiver may provide an indication of the detected signal strength at any time during the installation in a matrix code that may be provided and displayed on the display device. As described in more detail below, this information may in turn be used to adjust or tune the satellite dish to the proper position to receive a strong satellite signal.

Once the detected signal strength is encoded in a displayed matrix code, the reader device may obtain the matrix code from the display device in a similar manner as described above. In addition, once the matrix code is obtained, the reader device may retrieve the signal strength information from the matrix code. Once decoded, this information may be displayed on a display device associated with the reader device such that an installer may read the signal strength from the reader device. In this manner, an installer may utilize the reader device to obtain and read the encoded signal strength information for use during installation. Further, the installer may use this information and adjust the position of the satellite accordingly to improve the signal strength received at the receiver. In other embodiments, the matrix code or decoded information from the matrix code may be transmitted over the network to a third party entity by the reader device. In such embodiments, the signal strength information or other component related information, once received by the third party recipient, may then be relayed to an installer near the component or interpreted by the third party entity and instructions given to the installer for adjusting the component.

In addition, the third party entity may be any party, such as a provider of content to the distribution system, the managing entity of the distribution system, or a related entity (such as a billing entity). Thus, the reader device may decode the obtained matrix code and transmit, over the network, the signal strength information contained in the code to the third party entity. This information may be received by an operator of the satellite distribution system. In response to the received information, the operator may contact an installer with the information and provide instructions to the installer on adjusting the satellite dish receiver to improve the signal strength received at the receiver. In this manner, the signal strength information provided in the matrix code may be utilized to configure one or more components of a system during installation or start-up of the system.

In general, any measurement and/or communication message obtained by a component of the distribution system may be encoded and provided in a matrix code in this manner to aid an installer in configuring one or more components of the system. For example, a received "success" message indicating successful communication between components may be encoded and provided in the matrix code. In another example, a status message of one or more components of the system may be encoded in a displayed matrix code. In addition, the generated matrix code may include one or a plurality of such measurements or messages, which may then be read and interpreted by the system in a similar manner as described above.

Other system information may also be encoded and provided in a displayed matrix code and used for installation and/or configuration purposes. For example, identification information of one or more components of the system may be encoded in the matrix code. Often during installation and operation of a distribution system, component identification is used to configure messages and content that may be transmitted through the system to ensure that the components of the system receive the correct information. For example, the information transmitted through a system may include identifying features that indicate which components of the system receive the particular information. Thus, to provide this information, the system may maintain a list of components in the system and an identifier for one or more of those components such that content may be encoded with the component identifications.

To obtain these identifiers, identification information for one or more of the components of the system may be encoded into a matrix code that is displayed on a display device. For example, an ID number of the electronic device may be encoded into the matrix code. Once displayed, the matrix code may be captured by the reader device and the ID number may be obtained from the decoded code. This identification information may then be provided to the system by transmitting the information over the network or by having the information provided to the network by an installer. In other embodiments, the matrix code containing the ID number may be transmitted over the network to a system administrator that may then decode the matrix code and obtain the ID number. Regardless, once the ID number is transmitted to the recipient, the information may be maintained by the system for installation and utilized for content and information transmission purposes.

In another example, a smartcard ID associated with an electronic device may be encoded into the displayed matrix code. Smartcards may be a unique identifier associated with a receiver of a distribution system to identify the receiver to the system. The smartcard ID may be utilized by the system to encrypt content on the system such that only specific receivers may access the encrypted content. Thus, through the use of the smartcard ID, the receiver may be identified to the system for any number of purposes. For example, as mentioned, the content provided by the system may be encrypted with the smartcard ID number. In addition, the system may utilize the smartcard ID as the receiver identifier for customer service applications, such as troubleshooting the receiver or providing additional content to the receiver.

Further, as mentioned, this smartcard ID may be encoded into a matrix code and displayed on the display device. In this example, the smartcard ID may be obtained from the display device by the reader device in a similar manner as described above. Once obtained, the smartcard ID may be retrieved from the matrix code for use by the system. For example, the smartcard ID may be transmitted to the system through the network to identify the receiver for use in providing content to the receiver. In another example, the smartcard ID may be displayed on the reader device to a user of the reader device. In this example, a customer may provide the smartcard ID number to an operator over the phone during troubleshooting or upgrading of the receiver to aid in correctly identifying the receiver to the operator. Alternatively, the reader device may provide the smartcard ID number over the network directly to the operator or a computing device associated with the operator upon retrieval. In general, once the smartcard ID is retrieved, such information may be provided to any entity that may utilize the smartcard ID during use of the distribution system.

Figure 4:
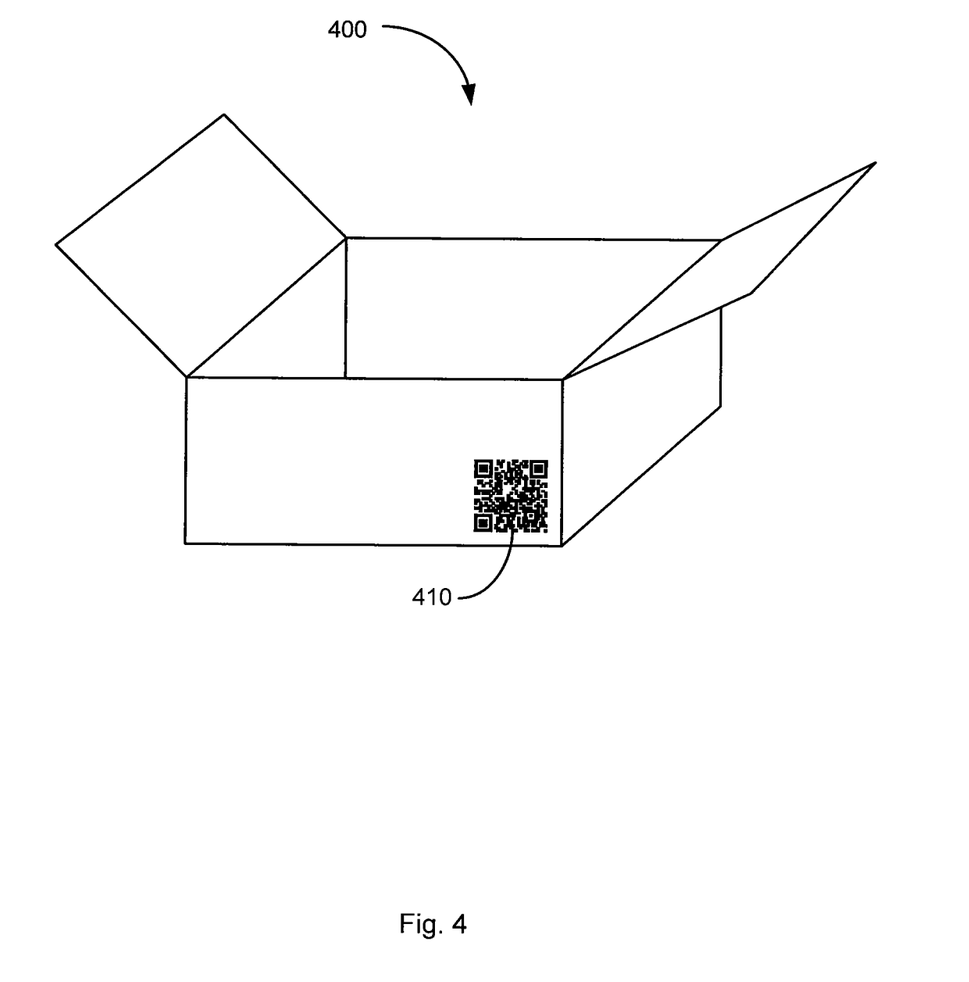
FIG. 4 is a diagram of a container for one or more components of a distribution system, the container including a matrix code containing information used during installation of the one or more components of the system.

In yet another embodiment, the matrix code containing information about one or more components of the system may not be displayed on the display device but may be available to be read from other items. For example, FIG. 4 is a diagram of a container 400 for one or more components of a distribution system, the container including a matrix code 410 containing information of the one or more components of the system. In this example, the matrix code 410 may be printed on the side of a container 400 in which one or more components of the system is delivered. The matrix code 410 may contain any information about the system, including a smartcard ID number for a receiver of the system. To retrieve the information encoded in the matrix code, a user of a reader device may obtain the matrix code in any manner described above utilizing a reader device. The retrieved information may be used for installation and/or configuration of one or more components of the system or for customer service purposes. In general, the matrix code may be provided on any surface accessible by a user of the system. For example, the matrix code may be included in an instruction booklet that accompanies one or more components of the system, located on the component itself, mailed separately to the user of the system and so forth.

Figure 5:
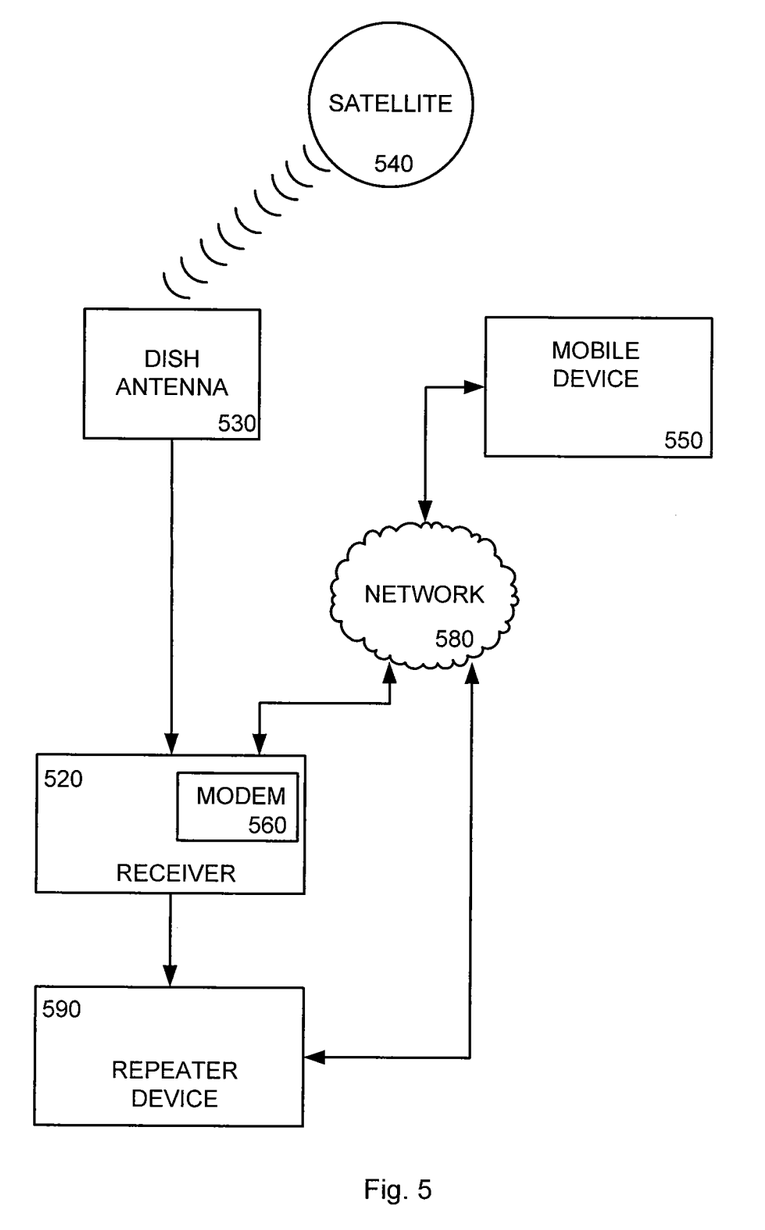
FIG. 5 is a block diagram illustrating a system for providing a multimedia presentation and for utilizing one or more matrix codes for initializing a repeater device of the system configured to provide one or more multimedia presentations to a mobile device.

In addition, the generated matrix code may also be utilized to integrate one or more components into a distribution system. For example, FIG. 5 is a block diagram illustrating a system for providing a multimedia presentation and for utilizing one or more matrix codes for initializing a repeater device of the system configured to provide one or more multimedia presentations to a mobile device. The one or more matrix codes may be utilized to provide the repeater device 590 with information for connecting to the network 580 through which the one or more multimedia presentations may be transmitted to the mobile device 550.

The satellite system of FIG. 5 is but one example of a system that may provide multimedia presentations for display on a display device or mobile device. Alternatively, a digital cable system or any other system may also utilize the embodiments described herein. Further, it should be appreciated that the system may include more or fewer components than described herein and such components may be interconnected in any manner. Additionally any type of signal may be communicated by the system, such as a video signal, an audio signal, an interactive signal, other signal types and any of various combinations and/or permutations of the foregoing. In general, any distribution system that provides multimedia presentations to a user for viewing may utilize the embodiments described herein.

The system of FIG. 5 may include at least one receiver 520 configured to provide a user with an interface to the system. In general, the receiver 520 of the system may receive an encrypted signal and convert it into a signal that a display or other compatible device may recognize and manipulate in order to present the multimedia presentation to one or more users. Further, the receiver 520 may provide the converted signal to a display device, such as a television or computer screen, for display to the user. In one implementation, the receiver 520 may receive the encrypted signal from a satellite 540 or through a digital cable or network connection. Further, in the satellite and digital cable configurations, the encrypted signal may be generated by a head-end (not shown) and transmitted to the receiver 520. Generally, the head-end may be a master facility that receives programming signals for processing and distribution to various systems. In a satellite television provider, the head-end may transmit the audio/visual signal to a satellite 540 for redistribution to end users, for example, subscribers to a satellite or cable television distribution system. Upon receipt, the satellite 540 may transmit the signal to a dish antenna 530 connected to the receiver 520 for decryption.

In a cable system configuration, the head-end may transmit the multimedia signal directly to the receiver 520 over a cable network connection. For example, the signal may be provided to the receiver 520 through a wired system connected, directly or indirectly, between the receiver 520 and the head-end 550. Alternatively, the signal may be provided over a network 580 connection, utilizing for example a modem 560 associated with the receiver 520.

Additionally, the head-end may utilize the network 580 to provide other communication signals to the receiver 520. For example, the head-end may utilize the network 580, the satellite 540 or other telecommunications connections to provide programming updates to the receiver 520. Similarly, the receiver 520 may communicate information to the head-end or to other networked devices. For example, the receiver may generate an instruction and/or information received at the head-end, within the network 580 or otherwise. In one implementation, the network 580 may be the Internet such that the signals transmitted over the network may include an Internet protocol (IP) address and may take the form of standardized packets of information for proper routing. In addition, the network may include and/or utilize various communication and networking topologies such as wireless, for example, WiFi, Bluetooth, WiMax, 3G, 4G and the like, and/or wired, such as a telephone system, LAN, WLAN, and the like, and/or any other known or hereinafter developed method to connect to the Internet.

In addition, the system may also include a repeater device 590 in communication with the receiver 520 and the network 580. In general, the repeater device 590 may be configured to receive one or more multimedia presentations from the receiver and subsequently transmit said multimedia presentations to one or more mobile devices by transmitting the one or more presentations through the network 580. In some embodiments of the distribution system, the repeater device 590 may be integrated into the receiver 520 such that communication with the network 580 may occur through the receiver modem 560, as described above. In at least one embodiment, the repeater device 590 may stream content to a receiving device, such as a mobile phone, for viewing by a user. One example of a repeater device is the SLINGBOX®, sold by Sling Media, Inc. of Foster City, Calif.

To receive the one or more multimedia presentations from the repeater device 590, the mobile device 550 may have access to the network 580 and, more specifically, to one or more components associated with the repeater device that may provide access to the presentations to a mobile device. Thus, the mobile device 550 may have some information that identifies the one or more components of the network 580 associated with the repeater device 590 such that the mobile device may receive the one or more multimedia presentations.

Such identification information may include, but is not limited to, an internet protocol (IP) address, a finder name, a uniform resource locator (URL) address, or any other identifier of components associated with the repeater device 590 or any other identifier of the repeater device itself. For example, the repeater device 590 may provide the one or more multimedia presentations to a server of the network 580 that may be accessed by providing a finder name associated with the repeater device to the server. This finder name may be provided by the mobile device 550 such that the one or more multimedia presentations may be transmitted to the mobile device from the server.

Utilizing the systems and/or methods described above, the identification information of the repeater device 590 or one or more components of the network 580 associated with the repeater device may be provided to the mobile device through one or more matrix codes. More particularly, the receiver 520 may generate one or more matrix codes that include identification information for the repeater device 590 that may aid a component of the system with connecting to the repeater device. For example, the identification information may include a finder name or IP address of the repeater device 590, or similar information of a component of the network 580 associated with the repeater device. Once generated, the one or more matrix codes with the identification information may be transmitted to and displayed on a display device.

Upon display, the one or more matrix codes may be obtained by a reader device as described above. The reader device may also decode the obtained matrix codes to retrieve the identification information contained within. This information may then be retained by the reader device to provide access to one or more multimedia presentations provided to the reader device over the network 580 by the repeater device 590. For example, the reader device may be a mobile phone with the capability of receiving and presenting a multimedia presentation. Therefore, the reader device may utilize the identification information retrieved from the one or more matrix codes to connect to and communicate with the repeater device 590 to receive one or more multimedia presentations. These presentations may then be displayed on a display screen associated with the reader device for viewing by a user of the reader device.

Similarly, the retrieved identification information may be provided to and utilized by any component of the distribution system to receive one or more multimedia presentations from the repeater device. For example, the reader device may retrieve the identification information and may transmit said identification information to a mobile device 550 configured to receive the one or more multimedia presentations from the repeater device 590. This information may be maintained and utilized by the mobile device to connect to and communicate with the repeater device 590 to receive the one or more multimedia presentations. In another embodiment, the identification information may be provided to a computing device, such as a laptop or similar device, such that the laptop may receive the one or more multimedia presentations from the repeater device 590. In general, the identification may be transmitted to any electronic device by the reader device over a network such that the electronic device may connect with the repeater device to receive the one or more multimedia presentations.

In addition, once the repeater device 590 is in communication with the mobile device 550, the repeater device may provide a signal to the receiver 520 to remove the one or more matrix codes displayed on the display device. In this manner, the system may provide an indication to the user of the system that successful communication between the mobile device 550 and the repeater device 590 has been established and that one or more multimedia presentations may be provided to the mobile device for viewing by the user.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to: a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined differently in various embodiments of the disclosure or described with different terminology. These and other variations, modifications, additions, and improvements may fall within the scope of the disclosure as defined in the claims that follow.

What is claimed is:

1. A method for configuring a device of a system, the method comprising:
   generating, utilizing an electronic device, one or more matrix codes including at least one measurement determined by the electronic device, wherein the at least one measurement determined by the electronic device is a signal strength of a transmitted signal received at a receiver of the system;
   transmitting, utilizing the electronic device, the one or more matrix codes to at least one display device;
   receiving the at least one measurement determined by the electronic device from a reader device; and
   providing instructions to configure the device of the system based on the at least one measurement determined by the electronic device.

2. The method of claim 1 wherein the at least one measurement determined by the electronic device is encoded within the one or more matrix codes.

3. The method of claim 1 further comprising:
   transmitting, utilizing the reader device, the at least one measurement determined by the electronic device over a network connection to a recipient entity.

4. The method of claim 1 further comprising:
   obtaining, utilizing a reader device, the one or more matrix codes from the at least one display device by acquiring a digital image of the at least one display device.

5. The method of claim 4 further comprising:
   decoding, utilizing the reader device, the obtained one or more matrix codes from the at least one display device to retrieve the at least one measurement determined by the electronic device.

6. The method of claim 1 wherein the at least one measurement determined by the electronic device includes an indicator of a successful communication between a plurality of components of the system.

7. The method of claim 1 further comprising:
   displaying the at least one measurement determined by the electronic device on a display device of an electronic device associated with an installer of the electronic device of the system.

8. A system comprising:
   a reader device comprising:
      at least one optical input component configured to obtain an image of at least one or more matrix codes presented by a display device; and
      at least one processing unit configured to decode the obtained one or more matrix codes to retrieve an identifier of one or more components of a distribution system, the one or more components comprising a repeater device, wherein the identifier of one or more components of the distribution system is utilized to encrypt one or more messages provided by the distribution system to the one or more components.

9. The system of claim 8, further comprising:
   an electronic device comprising:
      at least one processing unit that generates one or more matrix codes including the identifier of the one or more components of the distribution system; and
      at least one output component in communication with a display device, wherein the at least one processing unit transmits the one or more matrix codes to the display device utilizing the output component.

10. The system of claim 9 wherein the identifier of one or more components of a distribution system comprises an identification number of the electronic device.

11. The system of claim 9 wherein the identifier of one or more components of a distribution system comprises an identification number of a security processor associated with the electronic device.

12. The system of claim 9 wherein the identifier of one or more components of a distribution system comprises an internet protocol (IP) address associated with the electronic device.

13. The system of claim 8 further comprising:
   a network configured to receive the identifier of one or more components of the distribution system from the reader device and transmit the identifier to the distribution system.

14. The system of claim 8 wherein the reader device obtains the one or more matrix codes from the display device by acquiring a digital image of the display device.

15. A method for establishing communication between two electronic devices, comprising:
- obtaining, utilizing a reader device, a matrix code output by a television receiver, the matrix code including an identifier of a repeater device associated with the television receiver;
- retrieving the identifier of the repeater device associated with the receiver based on the matrix code; and
- utilizing the identifier of the repeater device to establish a connection between the reader device and the repeater device.

16. The method of claim 15 wherein the obtaining operation comprises:
- utilizing an optical reader associated with the reader device to acquire a digital image of a display device displaying content output by the television receiver.

17. The method of claim 15, further comprising:
- generating, utilizing the television receiver, the matrix code; and
- transmitting, utilizing the television receiver, the matrix code to a display device, wherein the reader device utilize an optical reader associated with the reader device to acquire a digital image of the display device to obtain the matrix code.

18. The method of claim 15 further comprising:
- receiving one or more multimedia presentations over a network at the reader device from the repeater device.

19. The method of claim 15 wherein the identifier of a repeater device associated with the receiver comprises an internet protocol (IP) address associated with the repeater device.

20. The method of claim 15 wherein the identifier of a repeater device associated with the receiver comprises a finder name associated with the repeater device.

* * * * *